United States Patent
LeCroy

(12) 
(10) Patent No.: US 6,421,740 B1
(45) Date of Patent: *Jul. 16, 2002

(54) DYNAMIC ERROR LOOKUP HANDLER HIERARCHY

(75) Inventor: Christopher S. LeCroy, San Jose, CA (US)

(73) Assignee: Apple Computer, Inc., Cupertino, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/579,572

(22) Filed: Dec. 27, 1995

(51) Int. Cl.$^7$ .............................................. G06F 9/00
(52) U.S. Cl. ........................ 709/331; 709/315; 714/38
(58) Field of Search ................................ 395/704, 682, 395/185.01, 185.1, 776, 777, 685, 183.14; 707/515, 514, 902, 907; 709/102, 305; 714/38, 48, 57

(56) References Cited

U.S. PATENT DOCUMENTS

| | | | | |
|---|---|---|---|---|
| 4,589,068 A | * | 5/1986 | Heinen, Jr. .................. | 364/300 |
| 5,325,533 A | * | 6/1994 | McInerney et al. ......... | 395/700 |
| 5,371,884 A | * | 12/1994 | Ross .......................... | 395/575 |
| 5,448,722 A | * | 9/1995 | Lynne et al. ................ | 395/650 |
| 5,471,675 A | * | 11/1995 | Zias ........................... | 395/162 |
| 5,526,485 A | * | 6/1996 | Brodsky ................ | 395/183.14 |
| 5,537,526 A | * | 7/1996 | Anderson et al. ........... | 395/148 |
| 5,628,016 A | * | 5/1997 | Kukol ......................... | 395/704 |
| 5,745,910 A | * | 4/1998 | Piersol et al. ............... | 707/515 |
| 5,761,407 A | * | 6/1998 | Benson et al. ......... | 395/183.13 |
| 5,761,513 A | * | 6/1998 | Yellin et al. ................ | 395/705 |
| 5,815,706 A | * | 9/1998 | Kessler et al. .............. | 395/683 |
| 5,974,568 A | * | 10/1999 | McQueen .................... | 714/38 |

OTHER PUBLICATIONS

Apple Computers, Inc., Inside Macintosh: QuickDraw GX Environment & Utilities, chapter 3, Jan. 1, 1994.*
C. Dony, "Improving Exception Handling with Object–Oriented Programming", Computer Software and Application Conference 1990 COMSAC, IEEE publications, pp. 36–42, 1990.*
Apple Computers, Inc., Inside Macintosh, vol. II, pp. 357–366, 1985.*
Q. Cui, "Data–Oriented Exception Handling", IEEE, pp. 393–401, 1992.*
D. Schmidt, et al, "The Service Configurator Framework: An Extensible Architecture for Dynamically Configuring Concurrent, Multi–Service Network Daemons", IEEE publication, pp. 190–201, Mar., 1994.*

* cited by examiner

Primary Examiner—Alvin E. Oberley
Assistant Examiner—Sue Lao
(74) Attorney, Agent, or Firm—Beyer Weaver & Thomas, LLP

(57) ABSTRACT

A method for processing a first error message to produce a second error message in a component-based architecture. The component-based architecture includes a framework which is associated with a first lookup handler and is capable of embedding a first component associated with a first executable unit for handling data of the first component. The method includes the step of generating a hierarchy of lookup handlers, the hierarchy including the first lookup handler and a second lookup handler associated with the first executable unit when the first component comes into focus. Further, the method includes the step of processing the first error message through the hierarchy of lookup handlers to generate the second error message. Through the hierarchy, the first error message is first processed through the second lookup handler. If the second lookup handler is unable to process the first error message, the first error message is then processed through the first lookup handler. In this manner, the second error message is more specific to the first component than the first error message.

26 Claims, 11 Drawing Sheets

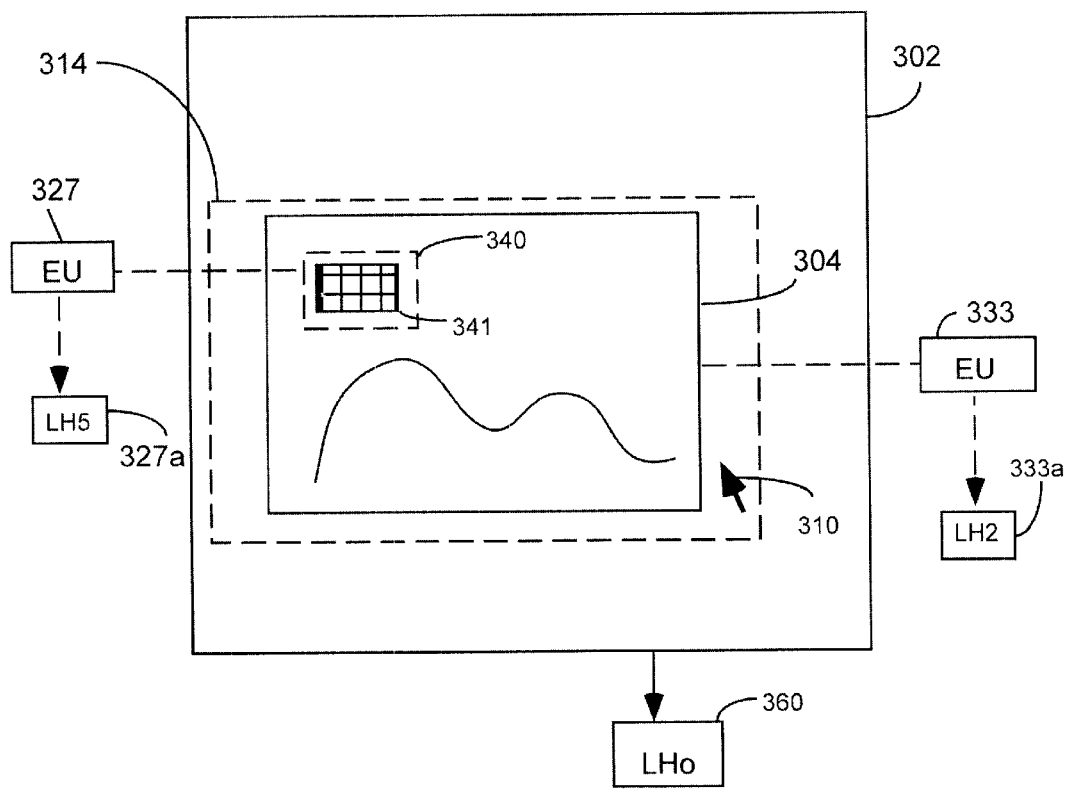
FIG. 3D
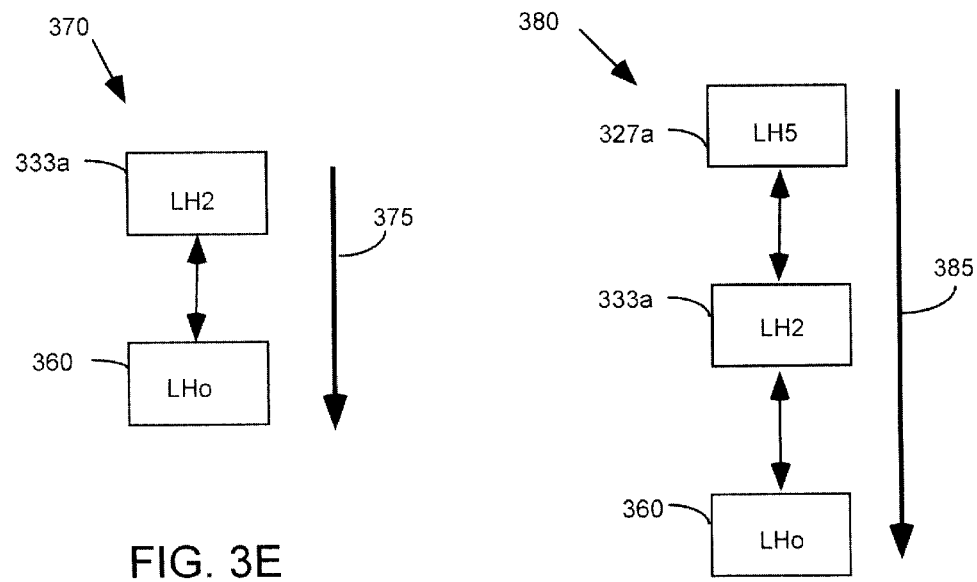
FIG. 3E
FIG. 3F

DYNAMIC ERROR LOOKUP HANDLER HIERARCHY

BACKGROUND OF THE INVENTION

The present invention relates generally to computer systems. More particularly, the present invention relates to improved apparatuses and methods for processing software error messages in a computer system.

Software errors are errors that occur in the course of a program's execution. In the prior art, there exist many methods for handling software errors when they occur. In one exemplary prior art method, software errors are handled by the computer operating system, which is endowed with programmed instructions to, for example, alert computer users of the problem encountered. By way of example, the operating system may detect that an out-of-memory condition has occurred and may communicate the error to the application program so that the application program may alert the user with an appropriate message using a generic error number such as "Error-28." By referencing the operating system user's manual, for example, the user would then be able to interpret the meaning of the error number and perhaps take appropriate corrective actions.

In a more advanced prior art system, developers of computer applications provide application-specific error lists, each of which contains a multiplicity of error numbers and their associated messages. FIG. 1 illustrates an application error list 100, which is utilized by an application program 102 to interpret the error numbers to generate error messages. By referencing its error list, an application program can provide the user with error messages that are more relevant in the context of the application program in which the error occurs.

By way of example, the above error number "28" (out of memory) may be decoded by a word processing application program (via its error list) into a message stating "too many characters in document." In a spreadsheet program, the same error number may be decoded (via the spreadsheet's error list) into a message stating, for example, "too many columns in spreadsheet." Similarly, a graphics application may process an out-of-memory error number or code into, for example, "too many colors." These messages, being specific to their application program, provide more meaning to the user than the above-mentioned generic error number ("Error-28"), i.e., the message that would have been generated had the operating system handled that error.

Application-specific error lists work well for application-centered, i.e., monolithic, applications. To elaborate, application-centered programs generally consist of data-handling codes to manage a predefined set of data types. A given monolithic document processing application program may contain codes to handle, for example, text and graphics. That monolithic application, however, would not be able to render and manipulate spreadsheet data or audio data that a user may wish to incorporate into the existing document at a later date. This is because application-centered programs cannot handle data types that are unknown to the program at the time of its creation.

The aforementioned limitation, among others, gives rise to a new type of software technology, i.e., one that is not application-centered. This new technology, referred herein as component-based architectures, allows different types of data to be rendered and manipulated within a given framework irrespective whether the framework is originally programmed to handle those types of data. In a component-based architecture, multiple data types may be embedded within the aforementioned framework, with each data type being rendered and manipulated by its own executable unit. Representative existing component-based architectures include OpenDoc™ by Apple Computer, Inc. of Cupertino, Calif. and OLE™ by Microsoft Corporation of Redmond, Wash. For further information regarding component-based architectures (e.g., OpenDoc™ by Apple Computer, Inc. of Cupertino, Calif.) reference may be made to, for example, commonly-assigned, pending patent application U.S. Pat. Ser. No. 08/175,549, now U.S. Pat. No. 5,745,910, entitled "Frame Structure Which Provides an Interface Between Parts of a Compound Document" which is hereby incorporated by reference.

The traditional approach to component-based architectures, however, may not enable the computer to provide a computer user with meaningful error messages when an error occurs in connection with a newly embedded data type. To facilitate a discussion of this problem, a compound document, representing one specific implementation of the aforementioned OpenDoc™ component-based architecture, is discussed below. It should be borne in mind, however, that the component-based architecture is not limited to only document processing programs and may be extended to implement any type of computer-implemented task.

FIG. 2A shows a prior art component-based compound document framework 202 having various embedded component data and corresponding executable units. An executable unit generally comprises the binary code that is responsible for executing, manipulating and rendering the component data. In this example, the embedded component data comprise a text component 200, a graphics component 204, a spreadsheet component 206 and an arbitrary component 208, representing an arbitrary data type. Arbitrary component 208 is included herein to show that any type of arbitrary data may be embedded within framework 202 and utilized as long as it is provided with its own associated executable unit. Additional components may be embedded in framework 202 of FIG. 2A as desired.

There are further shown in FIG. 2A focus frames 212, 214, 216 and 218, corresponding to text component 200, graphics component 204, spreadsheet component 206 and arbitrary component 208 respectively. As the terms are used herein, "frame in focus" or "focus frame" denote the area within framework 202 that contains an embedded component. A component becomes the component in focus when a pointer is moved into its associated focus frame, followed by a selection command, e.g., by clicking on a mouse or other suitable user interface commands (i.e., while the executable unit for that component is currently executing).

In FIG. 2A, focus frame 212 contains embedded text component 200, which is rendered and manipulated by executable unit 224. Focus frame 214 contains embedded graphics component 204, which is rendered and manipulated by executable unit 233. Within graphics component 204, there is further embedded a color adjustment component 241 and associated focus frame 240. Color adjustment component 240 is rendered and manipulated by executable unit 227 and may be employed to, for example, modify the number of colors with which the graphics data within graphics component 204 is presented. Color adjustment component 241 is shown herein to illustrate that multiple levels of embedding are possible.

Focus frame 216 contains embedded spreadsheet component 206, which is rendered and manipulated by executable unit 235. Likewise, focus frame 218 contains embedded arbitrary component 208, which is rendered and manipulated by its associated executable unit 230.

In the prior art, framework 202 of FIG. 2A may also be provided with a comprehensive error list 209 designed to process the aforementioned generic error numbers when an error condition is encountered. However, the creator of framework 202 has no way to anticipate all the possible types of data, present and future, that a user may embed into a framework. Because of this, there may be situations in which a new component data that is unanticipated by the framework developer becomes embedded. If an error occurs while this new data type is manipulated, i.e., while the executable unit associated with that new data type is executing, the prior art error list may fail to provide an error message that is specific enough to be useful to the computer user. In this case, the user may be presented with the only error message the computer knows, e.g., the aforementioned error number message "Error-28."

In view of the foregoing, what is needed is improved methods and apparatus for handling software errors in a computer system, particularly one that implements a component-based architecture.

SUMMARY OF THE INVENTION

The invention relates, in one embodiment, to a method for processing a first error message to produce a second error message in a component-based architecture. The component-based architecture includes a framework which is associated with a first lookup handler and is capable of embedding a first component associated with a first executable unit for handling data of the first component. The method includes the step of generating a hierarchy of lookup handlers, the hierarchy including the first lookup handler and a second lookup handler associated with the first executable unit when the first component comes into focus.

Further, the method includes the step of processing the first error message through the hierarchy of lookup handlers to generate the second error message. Through the hierarchy, the first error message is first processed through the second lookup handler. If the second lookup handler is unable to process the first error message, the first error message is then processed through the first lookup handler. In this manner, the second error message is more specific to the first component than the first error message.

In yet another embodiment, the invention relates to an apparatus for processing a first error message in a computer implementing a component-based architecture. The component-based architecture includes a framework that is capable of embedding a first component associated with a first executable unit for handling data of the first component. The apparatus includes a first lookup handler associated with the framework that is capable of processing the first error message to produce a second error message.

The apparatus includes a second lookup handler associated with the first executable unit. The second lookup handler is capable of processing the first error message to produce a third error message. The apparatus further includes means for installing the first lookup handler and the second lookup handler into a lookup handler hierarchy, whereby the lookup handler hierarchy includes the first lookup handler and the second lookup handler when the first component is in focus and the lookup handler hierarchy is arranged such that the first error message is processed by the second lookup handler first. If the second lookup handler is unable to process the first error message, the first error message is then processed by the first lookup handler.

These and other features and advantages of the present invention will become apparent upon reading the following detailed descriptions and studying the various figures of the drawings.

BRIEF DESCRIPTION OF THE DRAWINGS

FIG. 3D is a detailed illustration of the graphics component of FIG. 3A.

FIG. 3E illustrates the lookup handler hierarchy that is constructed when graphics component 304 becomes the component in focus.

FIG. 3F illustrates the lookup handler hierarchy that is constructed when the components of FIG. 3D become the components in focus.

DESCRIPTION OF THE PREFERRED EMBODIMENT

Figure 1:
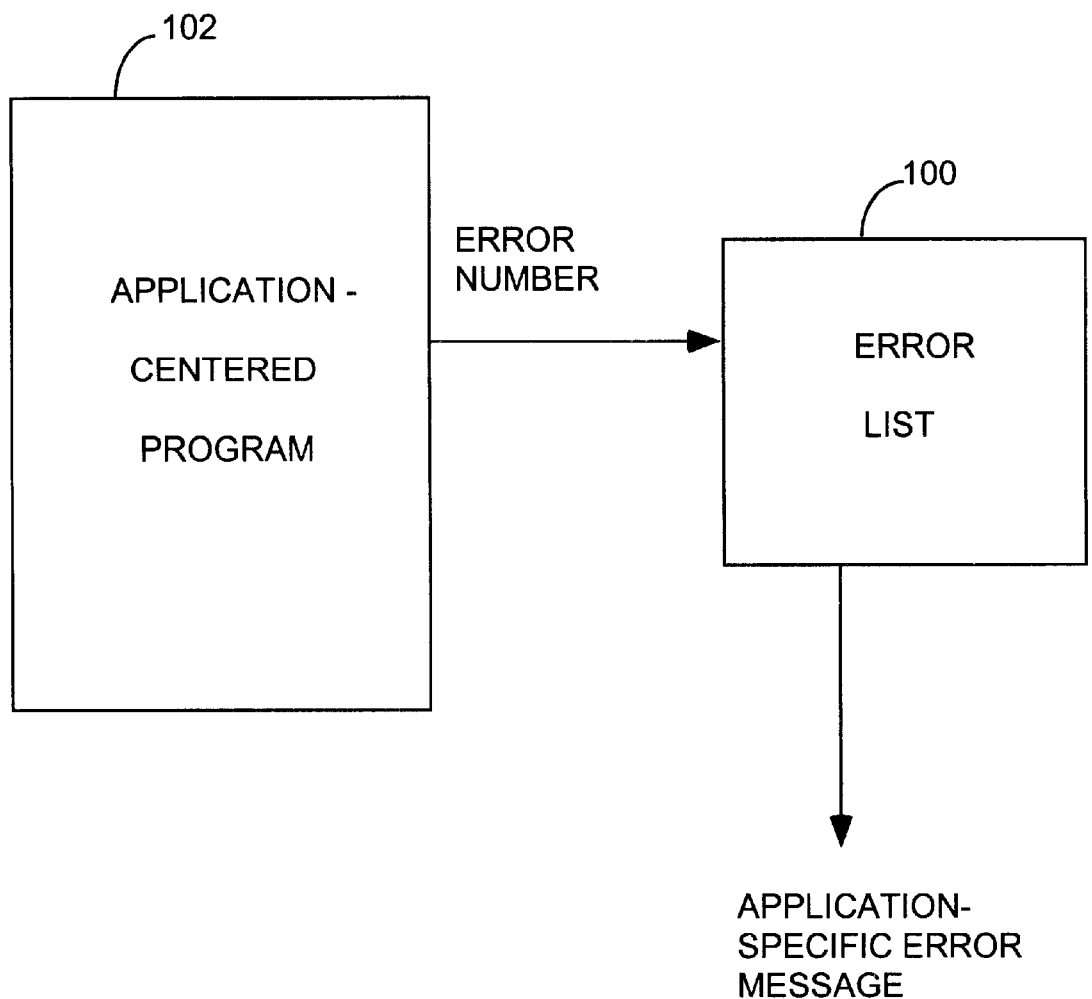
FIG. 1 illustrates a monolithic application having an associated error list.
Figure 2A:
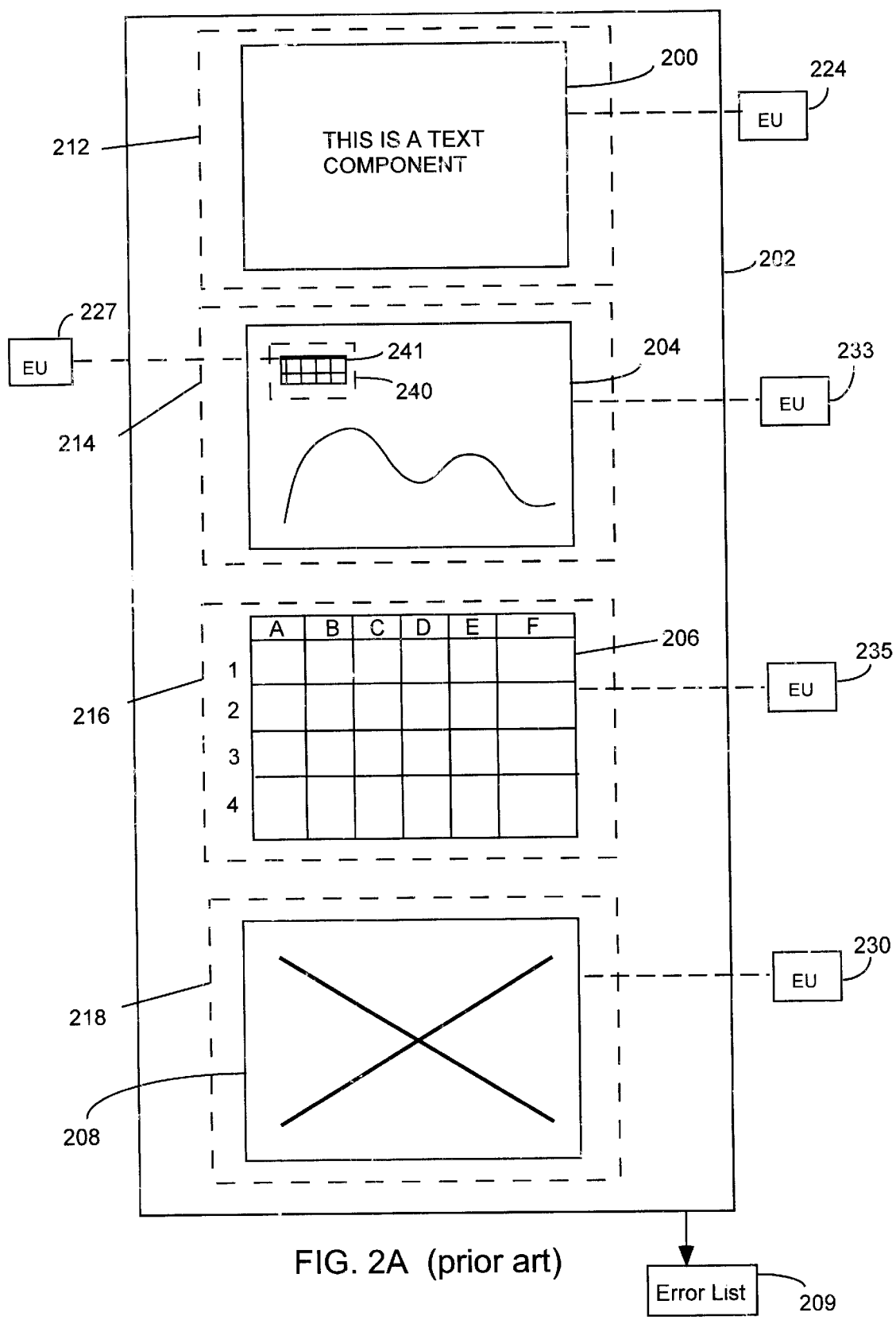
FIG. 2A shows a component-based compound document framework having various embedded components and corresponding executable units.

FIG. 1 illustrates a prior art monolithic application having an associated error list. FIG. 2A shows a component-based compound document framework having various embedded components and corresponding executable units.

Figure 2B:
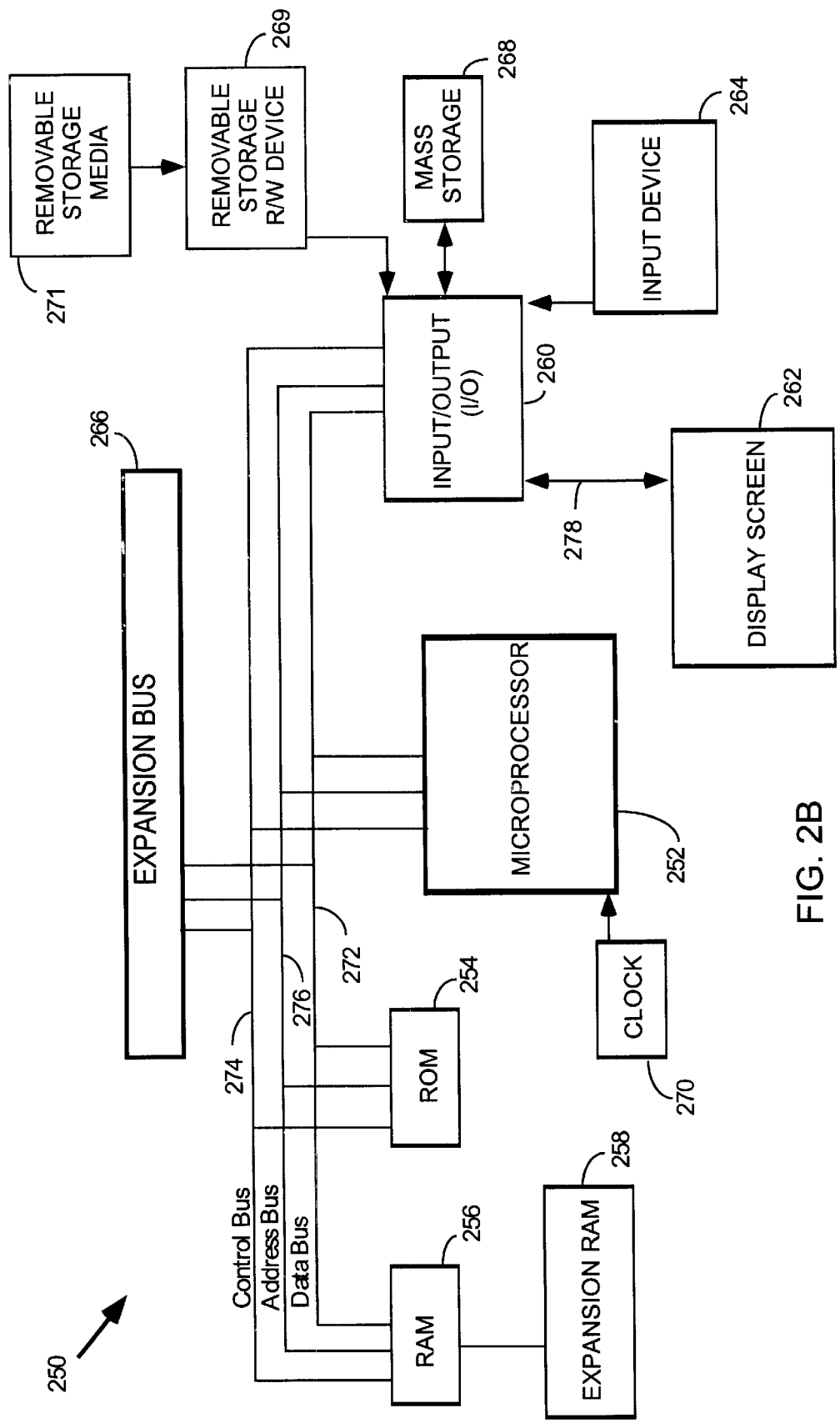
FIG. 2B illustrates a general purpose computer system, representing a suitable computer platform for implementing the inventive error handling technique.

FIG. 2B illustrates a general purpose computer system, representing a suitable computer platform for implementing the inventive error handling technique. FIG. 2B shows a general purpose computer system 250 in accordance with the present invention includes a central processing unit (CPU) 252, read only memory (ROM) 254, random access memory (RAM) 256, expansion RAM 258, input/output (I/O) circuitry 260, display assembly 262, input device 264, and expansion bus 266. Computer system 250 may also optionally include a mass storage unit 268 such as a disk drive unit or nonvolatile memory such as flash memory and a real-time clock 270.

CPU 252 is preferably a commercially available, single chip microprocessor such as one of the Intel X86 or Motorola 680XX family of chips, and is preferably a reduced instruction set computer (RISC) chip such as the PowerPC microprocessor available from Motorola, Inc. CPU 252 is coupled to ROM 254 by a data bus 272, control bus 274, and address bus 276. ROM 254 contains the basic operating system for the computer system 250. CPU 252 is also connected to RAM 256 by busses 272, 274, and 276 to permit the use of RAM 256 as scratch pad memory. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and such peripheral devices as display assembly 262, input device 264, and mass storage 268.

Display assembly 262 of computer system 250 is an output device. In the case of certain computers, such as the Apple™ Newton™, display assembly 262 also serves as a part of the input device. When operating as an input device, a position-sensing apparatus disposed on the surface of display assembly 262 works in cooperation with input device 264 to receive data input from the user. Accordingly, it is coupled to I/O circuitry 260 by a data bus 278. When operating as an output device, the display assembly 262 receives data from I/O circuitry 260 via bus 278 and displays that data on a suitable screen. Note that unless display assembly 262 serves an input function, it is not absolutely necessary that data bus 278 be bi-directional.

The screen for display assembly 262 can be a device that uses a cathode-ray tube (CRT), liquid crystal display (LCD), or the like, of the types commercially available from a variety of manufacturers. Input device 264 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for entering data and/or pointing to a particular location on a screen of a computer display. The aforementioned input devices are available from a variety of vendors and are well known in the art.

Some type of mass storage 268 is generally considered desirable. However, mass storage 268 can be eliminated by providing a sufficient amount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like.

A removable storage read/write device 269 may be coupled to I/O circuitry 260 to read from and to write to a removable storage media 271. Removable storage media 271 may represent, for example, a magnetic disk, a magnetic tape, an opto-magnetic disk, an optical disk, or the like. Instructions for implementing the inventive method may be provided, in one embodiment, to a network via such a removable storage media.

In operation, information is inputted into the computer system 250 by typing on a keyboard, manipulating a mouse or trackball, or "writing" on a tablet or on position-sensing screen of display assembly 262. CPU 252 then processes the data under control of an operating system and an application program stored in ROM 254 and/or RAM 256. CPU 252 then typically produces data which is outputted to the display assembly 262 to produce appropriate images on its screen.

Expansion bus 266 is coupled to data bus 272, control bus 274, and address bus 276. Expansion bus 266 provides extra ports to couple devices such as network interface circuits, modems, display switches, microphones, speakers, etc. to CPU 252. Network communication is accomplished through the network interface circuit and an appropriate network.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

The inventive technique for handling error messages will now be discussed in detail. In accordance with one aspect of the invention, the executable unit that is associated with the component in focus will create a lookup handler hierarchy (hereinafter" lookup handler hierarchy" or simply "hierarchy") when the component comes into focus. The lookup handler hierarchy is created out of novel entities called lookup handlers, each of which is specifically associated with an executable unit. The lookup handler may represent, for example, a simple lookup table for correlating generic error numbers with error messages that are specific to the associated component data. In a component-aware architecture, an lookup handler may be implemented as a component that is separated from, but associated with, its executable unit. Alternatively, an lookup handler may be implemented as a function within the code of the executable unit. Errors that are generated during execution will be interpreted in accordance with the lookup handler hierarchy, and messages derived therefrom will be presented to the user.

In accordance with one aspect of the present invention, the lookup handler hierarchy is dynamically revised as each component comes into focus. Concomitantly, the lookup handler hierarchy also gets revised as a component goes out of focus, i.e., no longer the subject of current operation. Further, the hierarchy is preferably arranged such that the lookup handlers therein generate the most specific error message possible for the component in focus. Once generated, error messages may be presented in the form of a graphical user interface (GUI), and may consist essentially of text dialogs, sounds, voice or the like.

To achieve the foregoing, lookup handlers are arranged in a predefined order, from the most specific to the most general. The most specific lookup handler is one that is the component currently in focus while the most general one is the lookup handler associated with the framework. To further elaborate, the lookup handlers are preferably arranged in the order in which their associated components are nested, with the lookup handler associated with the component in focus, if such a lookup handler is available, being the first in the hierarchy. The next lookup handler in the hierarchy is the one associated with the component that embeds the component in focus, if such a lookup handler is available, and so on. The last lookup handler in the hierarchy is preferably the lookup handler associated with the framework. If an executable unit does not have associated with it a lookup handler, e.g., the associated lookup handler is not provided by the developer of the executable unit, the hierarchy simply does not require its inclusion.

When an error occurs, it is preferably handled by the first lookup handler in the hierarchy, i.e., the one associated with the component in focus if that lookup handler is available. If the lookup handler associated with the component in focus is not available (and therefore does not get installed into the lookup handler hierarchy), or if that lookup handler is unable to process the error, the next lookup handler in the hierarchy handles the interpreting task. A lookup handler may fail to process an error when, for example, the error is of a type that is not anticipated by the developer of the associated executable unit. If the entire lookup handler hierarchy, including the lookup handler associated with the framework, is unable to process the error, the error number, e.g., the aforementioned "Error-28," may be provided to the user as a last resort.

To facilitate understanding, a compound document will now be used to illustrate the inventive dynamic error lookup handler hierarchy. Although the following embodiments will be described with reference to compound documents and their components, it should be understood that the invention will have application to any form of component-based architecture. In fact, it is specifically contemplated that the invention will find use in a component-based system for managing services in a computer network, i.e., a remote network administration program. For more information on such a remote network administration program, reference may be made to commonly assigned, pending patent application U.S. Pat. Ser. No. 08/605,325, filed on even date and entitled "Improved Remote Network Administration Methods and Apparatus", which is incorporated by reference herein.

Figure 3A:
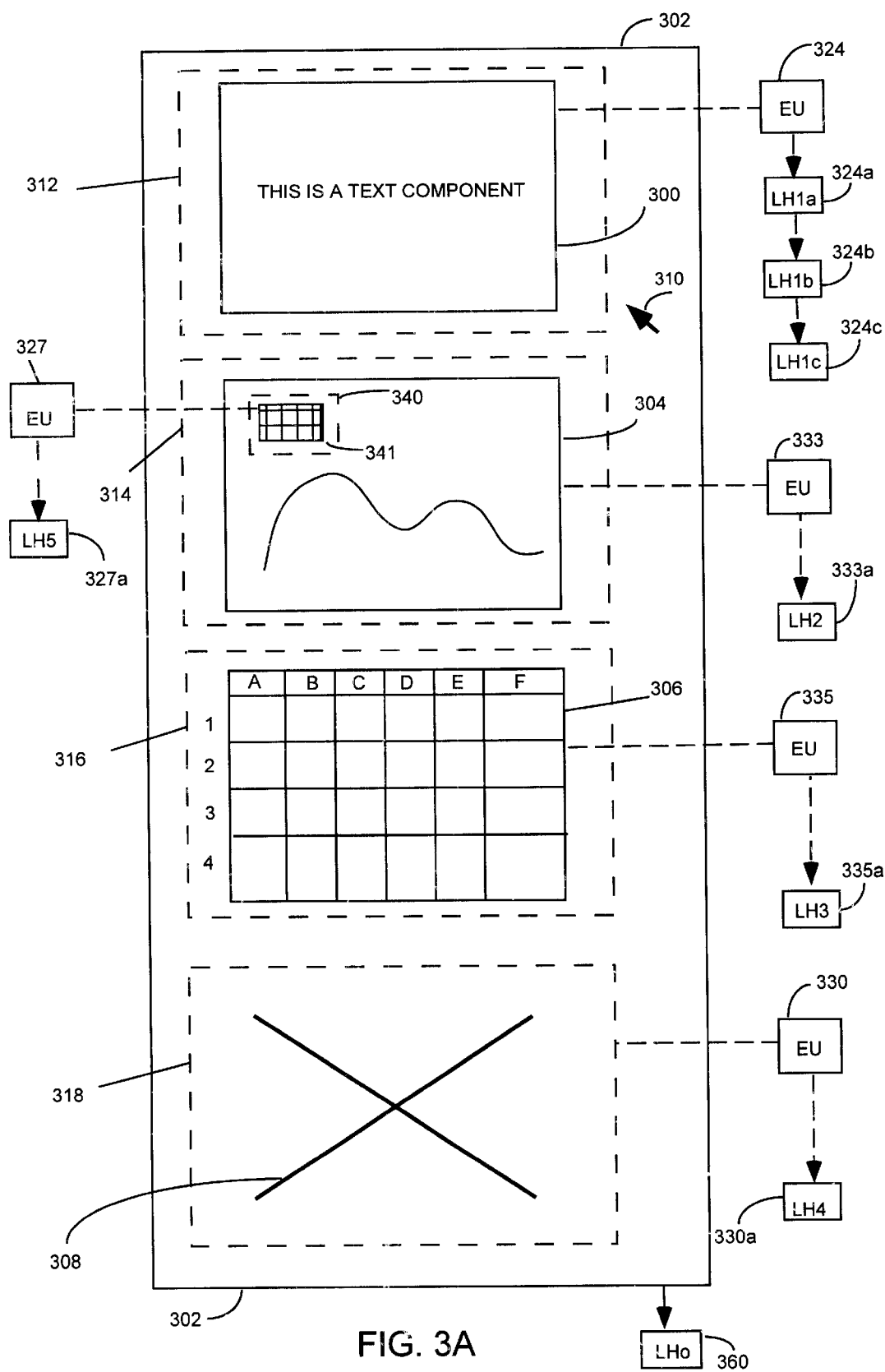
FIG. 3A illustrates, in one embodiment, a compound document comprising a framework having embedded components and their associated executable units.

FIG. 3A illustrates, in one embodiment, a compound document comprising a framework 302 having four embedded components and their associated executable units. In FIG. 3A, there is shown a text component 300, a graphics component 304, which itself embeds a color adjustment component 341, a spreadsheet component 306, and an arbitrary component 308. These components are analogous to respective components 200, 204, 241, 206, and 208 of FIG. 2A. Although only specific example components are described herein, it is envisioned that any type of data component may be embedded or substituted for the exemplary components. Examples of such additional components include, for example, a computer aided design (CAD) component, a financial planning component or any other type of component.

For illustration purposes, a text component 300 is contained within a focus frame 312 and is embedded in framework 302. Focus frame 312 denotes the area where text component 300 is contained. As mentioned earlier, a component becomes the component in focus when a pointer 310 is positioned within its focus frame and the user selects the component data. In one embodiment, selection may be accomplished by clicking on computer mouse, touching an interactive screen, typing on a keyboard or the like.

Associated with text component 300 is an executable unit 324, representing, for example, the aforementioned word processor component. As discussed in FIG. 2A, an executable unit (EU) generally comprises the source code responsible for executing, manipulating and rendering its associated component data. Executable unit 324 is shown associated with a set of lookup handlers 324a–324c. As mentioned above, a lookup handler provides a mechanism for interpreting generic error numbers, such as the aforementioned "Error-28," which denotes an "out of memory" condition, into an error message that is more meaningful in the context of the data in focus. In the present example, one of lookup handlers 324a–324c may interpret the aforementioned "Error-28" generic error number into, for example, "too many characters in this document."

In accordance with one aspect of the present invention, the lookup handlers are provided by the developers of the executable unit with which the lookup handlers are associated. As long as the developer furnishes a lookup handler with his executable unit, it is possible to provide with every type of component data a mechanism for providing error messages that are specifically tailored to that component data. Because of the component-based architecture, it is not necessary for the developer of framework 302 to know in advance these component data or even how to interpret errors that arise from their manipulation. As mentioned earlier, it is in fact unrealistic to expect the developer of framework 302 to know about data types that may be developed well into the future and embedded into framework 302 by a future computer user. Irrespective of the nature of the component data being embedded, the present invention permits error messages that are generated while that component data is in focus to be interpreted in a manner that is more useful to the computer user in the context of the component data in focus.

With reference back to FIG. 3A, also embedded in framework 302 is a graphics component 304. Graphics component 304 is associated with a focus frame 314 and an executable unit 333 representing, for example, a drawing program. Executable unit 333 is in turn associated with a lookup handler 333a for interpreting generic error numbers into messages that are specific to graphics component 304.

Embedded in graphics component 304 is a nested color adjustment component 341 having a focus frame 340, and an associated executable unit 327. In the present example, color adjustment component 341 represents the component that, when activated, allows the user to adjust the color of the data in graphics component 304. Executable unit 327 is in turn associated with a lookup handler 327a. Although only one nested component 341 is shown, it should be understood that there may be any number of nested components either in component 304 or in any other component of FIG. 3A.

Also embedded in framework 302 is a spreadsheet component 306. Spreadsheet component 306 also has an associated focus frame 316 and an executable unit 335, representing the component for displaying and manipulating spreadsheet data. There is provided a lookup handler 335a, which is specifically associated with executable unit 335. For simplicity, spreadsheet component 306 does not have nested components; however, any number of nested components may be embedded.

An additional arbitrary focus frame 318 is also shown to indicate that any number of additional nested or flat components may be embedded in framework 302. Within focus frame 318, there is also shown an arbitrary component 308 and an associated executable unit 330. This executable unit 330 is in turn associated with a lookup handler 330a. Arbitrary component 308, executable unit 330, and lookup handler 330a are shown herein to signify that any type of component data may be embedded into framework 302. As long as that component is provided with its own executable unit (and associated lookup handler), errors that are generated while that component data is in focus can be intelligently deciphered by the inventive dynamic error lookup handler hierarchy.

The lookup handler hierarchy that is formed when each of the components shown in FIG. 3A comes into focus will now be described in greater detail. For ease of explanation, the dynamically created lookup handler hierarchy will be described from the simplest to the most complex. Consequently, spreadsheet component 306 will be discussed first, and text component 300 will be discussed last.

Figure 3B:
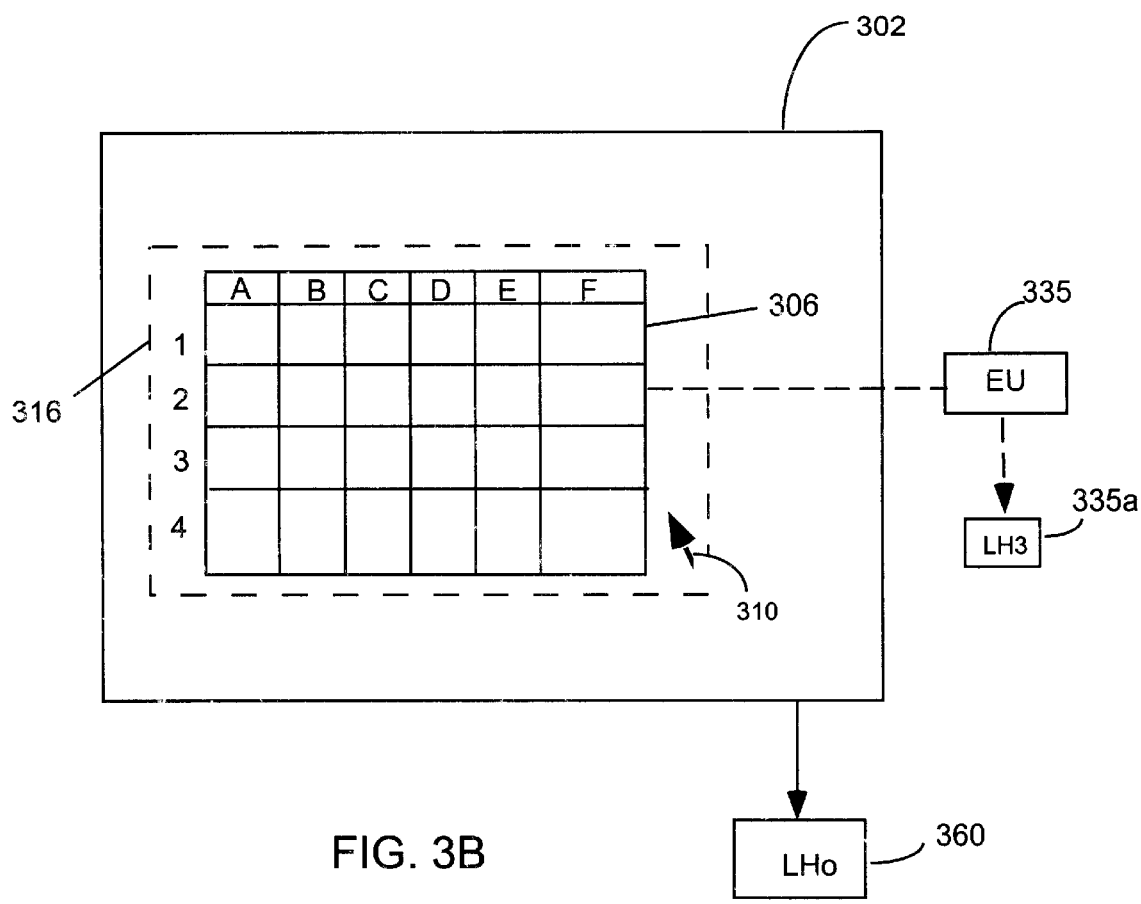
FIG. 3B is a detailed illustration of the spreadsheet component of FIG. 3A.

FIG. 3B is a detailed illustration of spreadsheet component 306, which is embedded in framework 302. As mentioned earlier, when pointer 310 is moved into focus frame 316 and spreadsheet data is selected, spreadsheet component 306 becomes the component in focus. At this point, executable unit 335 will be responsible for rendering and manipulating the spreadsheet data. When spreadsheet component 306 comes into focus, executable unit 335 will install its associated lookup handler, i.e., lookup handler 335a, into the lookup handler hierarchy. In one embodiment, this is accomplished by referring to a shared error message dictionary library 439 (hereinafter "shared library 439" and described in more detail in FIG. 4 below) and employing the installation facility provided therein to get associated lookup handler 335a installed into the hierarchy.

The existing lookup handler hierarchy is preferably modified as a component comes into or out of focus. When an error occurs, the lookup handler hierarchy, which preferably includes the component specific lookup handlers, would then be ready to interpret the error and provide a component-specific error message as quickly as possible.

Figure 3C:
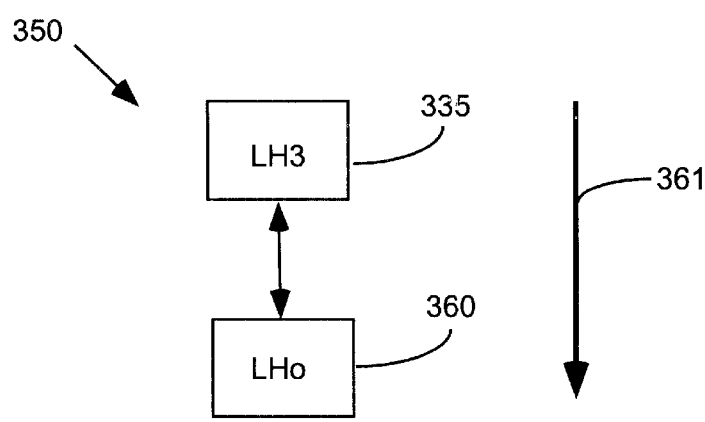
FIG. 3C illustrates the lookup handler hierarchy that is constructed when the spreadsheet component of FIG. 3B becomes the component in focus.

FIG. 3C illustrates the lookup handler hierarchy 350 that is constructed when spreadsheet component 306 of FIG. 3B becomes the component in focus. Lookup handler hierarchy 350 comprises lookup handler 335a (LH3) and lookup handler 360 (LHo). As shown in FIG. 3A, lookup handler 335a (LH3) is associated with spreadsheet component 306, and lookup handler (LHo) 360 is associated with framework 302. When an error occurs and a generic error number is generated by the operating system, e.g., "28", this generic error number is first processed by lookup handler 335a (LH3). However if lookup handler 335a (LH3) fails to process the generic error number that arises from the use of spreadsheet component 306, the generic error number will traverse down the hierarchy to be processed by lookup handler 360 (LHo). If lookup handler 360 (LHo) also fails, the error number, e.g., "Error-28," will be presented to the user in one embodiment.

As is seen, the lookup handler hierarchy will preferably process the generic error number through the lookup handler associated with the component in focus, and if the lookup handler associated with the component in focus is unavailable or fails to handle the generic error number, the framework's lookup handler will process the error number. Hence, the error will be interpreted in the direction of arrow 361.

FIG. 3D is a detailed illustration of graphics component 304 and color adjustment component 341, which is nested inside graphics component 304. When graphics component becomes the component in focus, its associated executable unit 333 will install its associated lookup handler 333a (LH2) into the lookup handler hierarchy in a manner analogous to that discussed in connection with FIG. 3C. As mentioned earlier, this installation step may be accomplished in one embodiment simply by employing the installation function provided within the aforementioned shared library 439.

By way of example, FIG. 3E illustrates the lookup handler hierarchy 370 that is constructed when graphics component 304 becomes the component in focus. Error numbers are processed in accordance with the direction of arrow 375. Lookup handler hierarchy 370 comprises lookup handler 333a (LH2), representing the lookup handler associated with graphics component 304 and is the first lookup handler for handling the error. An error message generated by this lookup handler 333a (LH2) may read, for example, "too many graphics objects in drawing."

Also installed in lookup handler hierarchy 370 is lookup handler 360 (LHo), representing the lookup handler that serves as a backup lookup handler to lookup handler 333a (LH2). An error message generated by lookup handler 360 (LHo) may read, for example, "out of memory while manipulating component data embedded in framework." This message is general since it is generated by the framework's lookup handler, which may not know about the data type of graphics component 304 to offer a more specific error message.

Color adjustment component 341 is shown embedded in graphics component 304 and is also shown with its associated executable unit 327. If pointer 310 is moved within focus frame 340 and color adjustment component 341 is selected, executable unit 327 will install its associated lookup handler 327a (LH5) into the lookup handler hierarchy.

FIG. 3F illustrates the lookup handler hierarchy 380 that is constructed when nested color adjustment component 341 becomes the component in focus. Errors are processed in accordance with the direction of arrow 385. Lookup handler hierarchy 380 comprises lookup handler 327a (LH5), representing the lookup handler associated with color adjustment component in focus 341 and is the first lookup handler to handle an error that arises. An error message generated by this lookup handler may read, for example, "Too many colors chosen for the amount of memory available."

However, if lookup handler 327a (LH5) fails to process such generic error number, lookup handler 333a (LH2), representing the lookup handler associated with the component that embeds color adjustment component 341, i.e., graphics component 304, would be next in line to process the error. At this level, the error message generated is more general in nature and may read, for example, "too many graphics objects in drawing." The message is general since graphics component 304 may not know the data type of color adjustment component 341 (in general, the components do not communicate with one another or know about each other's data type). Similarly, if lookup handler 333a (LH2) fails to process the error message, installed lookup handler 360 (LHo), representing the lookup handler associated with framework 302, would process the error. In this case, the error message that is generated is even more general, for example, "out of memory while manipulating component data embedded in framework." As a last resort, if none of the hierarchy's lookup handler can interpret the message, the error number may be presented to the user in one embodiment.

Figure 3G:
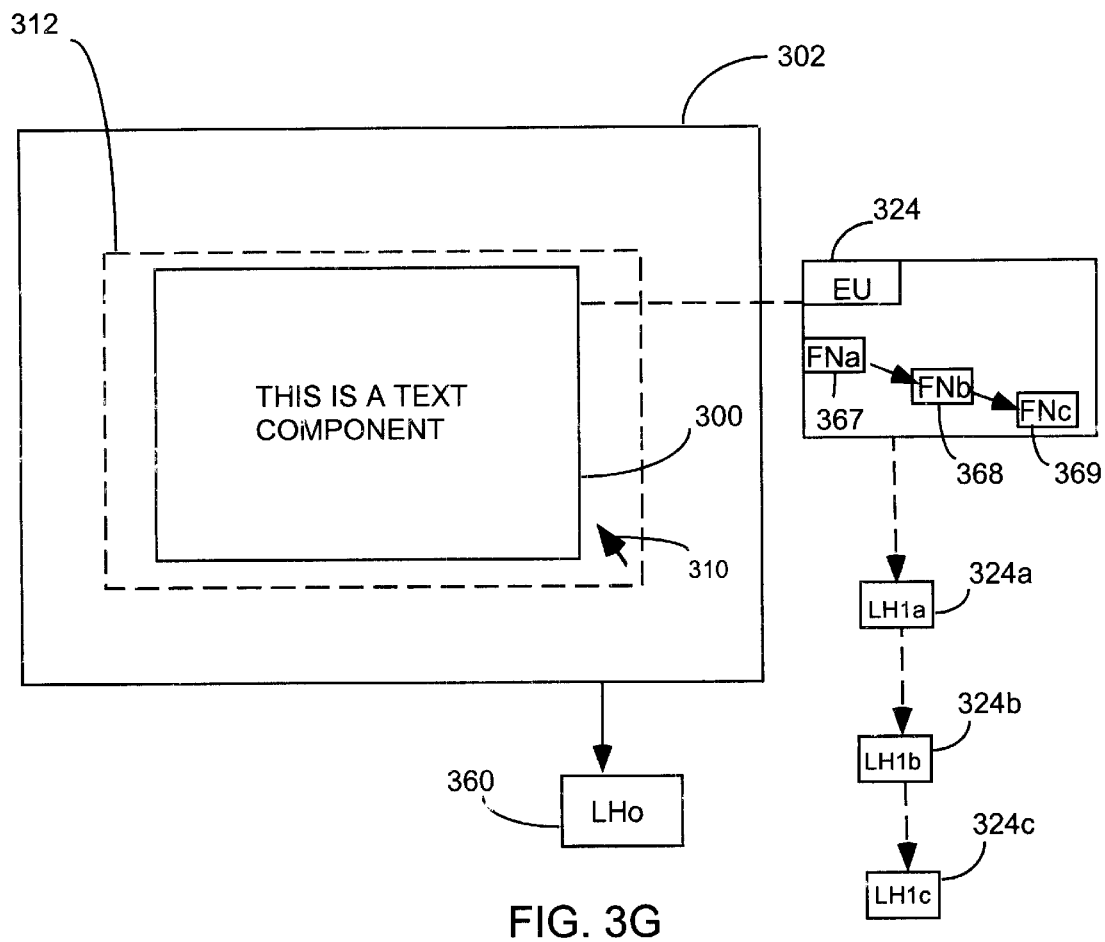
FIG. 3G is a detailed illustration of the text component of FIG. 3A.

FIG. 3G is a detailed illustration of text component 300, which is embedded in framework 302. Unlike the components of FIGS. 3B–3F, in which each component is associated with a single lookup handler, text component 300 has associated with it a plurality of lookup handlers. In the example of FIG. 3G, the lookup handler set associated with executable unit 324 of text component 300 comprises lookup handler 324a (LH1a), lookup handler 324b (LH1b), and lookup handler 324c (LH1c). The lookup handlers of FIG. 3G correspond respectively to functions 367, 368, and 369. In this example, function 369 is nested within function 368, which is itself nested within function 367. The lookup handler hierarchy that is formed while text component 300 is in focus depends on which one of functions 367, 368, and 369 is currently executed.

By way of example, if function 367 is executed while text component 300 is in focus, only lookup handler 324a (LH1a) out of the three lookup handlers will be installed into the hierarchy. If function 368 is executed while text component 300 is in focus, both the lookup handler associated with function 368 and the lookup handler associated with the parent function of 367 are installed. In other words, both lookup handlers 324a (LH1a) and 324b (LH1b) are installed into the hierarchy. However, the error number will be processed first by the lookup handler associated with the executed function, i.e., lookup handler 324b (LH1b) in this case.

Figure 3H:
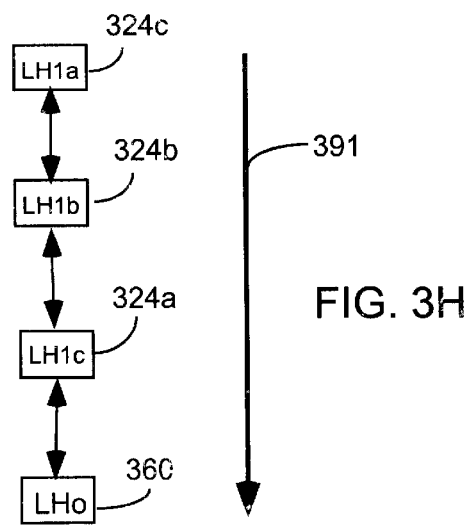
FIG. 3H show the hierarchy that results when the functions of FIG. 3G become executed.

Likewise, if function 369 is executed while text component 300 is in focus, all three lookup handlers 324a (LH1a), 324b (LH1b), and 324c (LH1c), representing the lookup handlers associated with function 369 and its parent functions, are installed into the hierarchy. FIG. 3H show the hierarchy that results in this case, along with the direction (shown by arrow 391) that the error will be processed through the hierarchy of lookup handlers. Thus, if an error occurs while the user was executing a function, error messages specific to that function would preferably be generated by the hierarchy. If that fails, error messages specific to its parent function are preferably generated, and so on.

Figure 4:
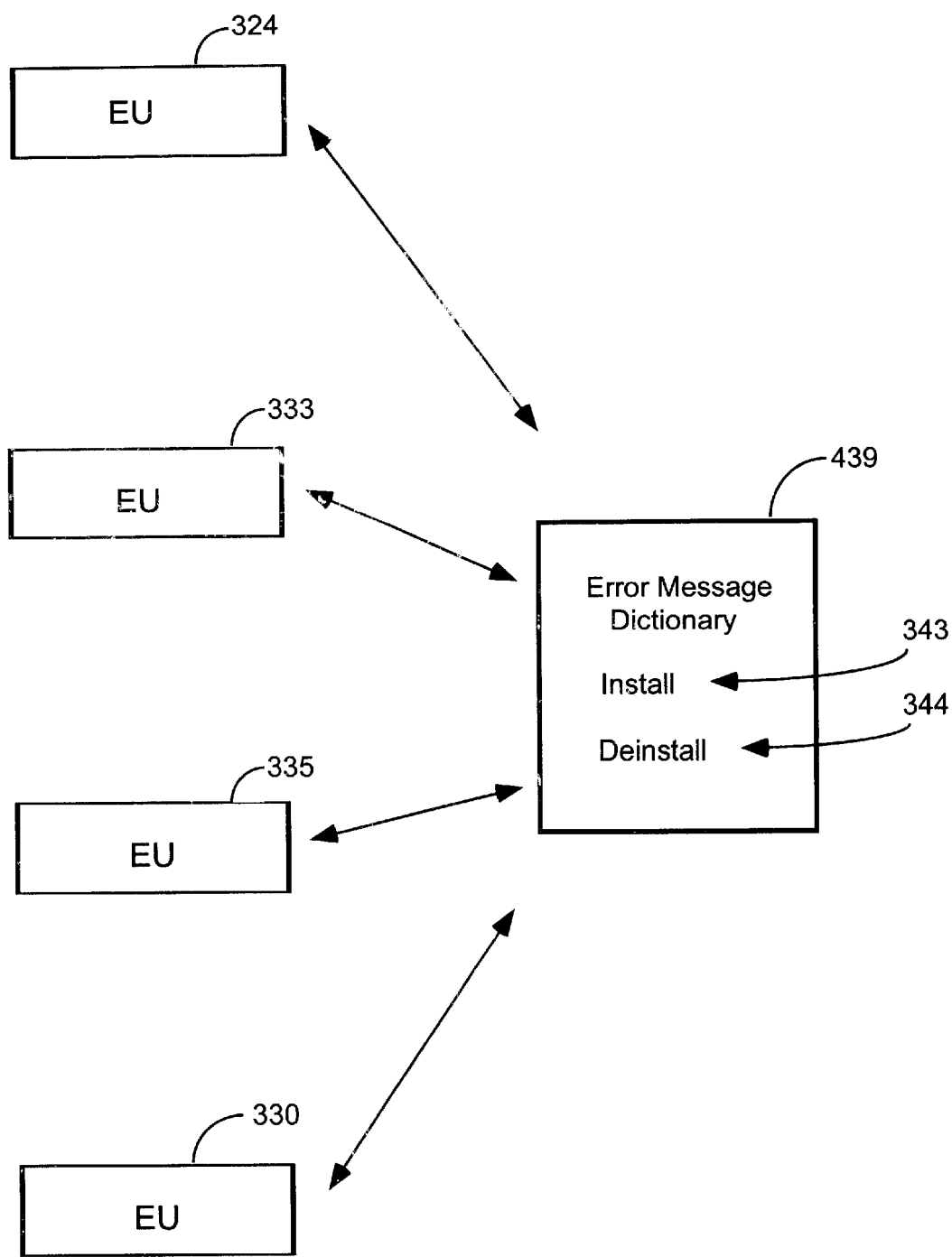
FIG. 4 illustrates a shared error message dictionary library, representing the entity responsible, in one embodiment, for installing and de-installing the lookup handlers described in FIGS. 3A–3H.

FIG. 4 illustrates shared error message dictionary library 439, representing the entity responsible, in one embodiment, for installing and de-installing the lookup handlers described in FIGS. 3A–3H. Shared library 439 includes, among others, two functions: install 343 and de-install function 344. These two functions can be called by any executable unit, e.g., executable unit 324, 327, 330, 333, or 335, to request the functions to respectively install or de-install its associated lookup handler.

To elaborate further, when a component comes into focus, it calls function install 343 to install its associated lookup handler into the hierarchy. By way of example, if the hierarchy is implemented by a double-linked list, function install function 343 preferably includes codes for appending the lookup handler associated with the newly focused component to the top of the hierarchy. In this manner, any error that arises in connection with that component data will be handled by this newly appended lookup handler first. If this lookup handler fails to interpret the error, i.e., its lookup handler does not understand the error number being generated, that error number traverses down the hierarchy to be handled by a lookup handler further down the list. With reference to FIG. 3C, if lookup handler 335 (LH3) fails to handle an error, the error number associated with that error will be handled next by lookup handler 360 (LHo), which is the lookup handler associated with the component that embeds the component associated with lookup handler 335 (LH3).

Note that it is entirely possible that a component may not be provided with any lookup handler. In that case, a call to function install will not result in a modification of the existing lookup handler and any error that arises will be handled by the lookup handler down the chain (which presumably will generate error messages that are not very specific to the component data in focus).

On the other hand, a call to function de-install 344 will cause the lookup handler that is associated with the component data going out of focus to be removed from the hierarchy. Again, if the hierarchy is implemented as a double-linked list, a call to function de-install 344 may, for example, cause pointers to the associated lookup handler to be reassigned, thereby removing this lookup handler from the list.

Note that since the hierarchy can be implemented by other types of data structures beside the aforementioned double-linked list, function install 343 and de-install 344 can be implemented in various ways. The specific implementation details of these functions for a particular hierarchy data structure is well within the ability of one skilled in the art given this disclosure.

Figure 5:
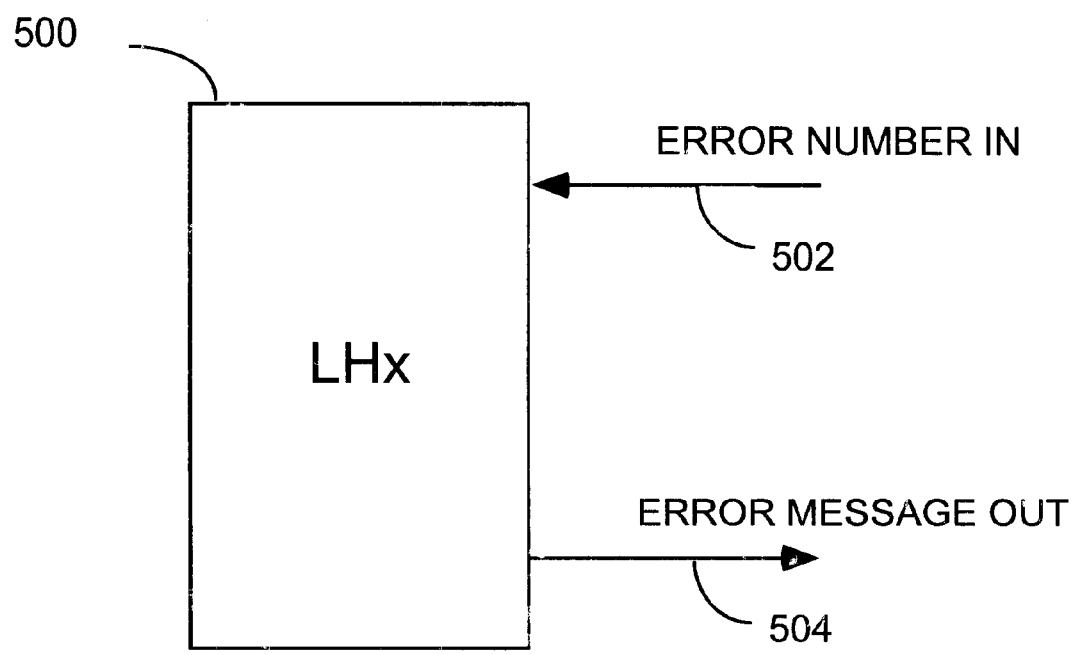
FIG. 5 illustrates, in one embodiment, a lookup handler application programming interface (API) for generating error messages.

FIG. 5 illustrates, in one embodiment, a lookup handler application programming interface (API) for generating error messages. Lookup handler X (LHx), representing any of the lookup handlers discussed herein, receives a generic error number in the direction of arrow 502. Generic error numbers may take the form of either numbers, codes, digits, alpha-numeric variables or the like. The generic error number is then processed into a more context-specific error message to be output along the direction of arrow 504.

Figure 6:
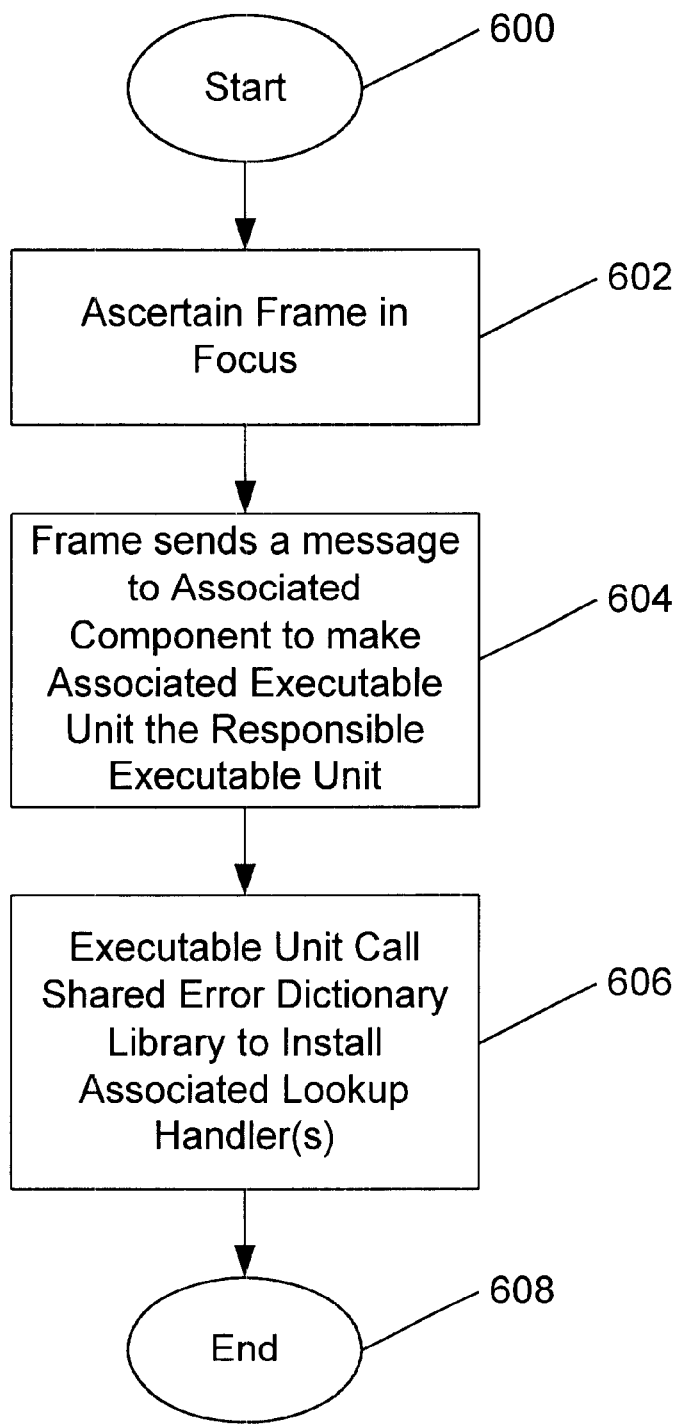
FIGS. 6 and 7 illustrate the steps for installing and deinstalling lookup handlers into the lookup handler hierarchy in accordance with one embodiment of the present invention.

The steps for installing and deinstalling lookup handlers into the lookup handler hierarchy will now be discussed with reference to FIGS. 6 and 7. FIG. 6 shows, in accordance with one aspect of the present invention, the steps for installing lookup handlers when a component becomes the component in focus. FIG. 6 starts at step 600. From step 600, the method proceeds to step 602 to ascertain the frame in focus. In one embodiment, moving a screen pointer (e.g., screen pointer 310 of FIG. 3A) within a frame and subsequently selecting the component data within that frame causes the frame to be designated the frame in focus.

From step 602, the method proceeds to step 604 where the frame in focus sends a message to its associated component to make its associated executable unit the executable unit responsible for rendering and manipulating the component data.

From step 604, the method proceeds to step 606 where the executable unit associated with the frame in focus (ascertained in step 602) calls the shared library 439 of FIG. 4 to install its associated lookup handler, if there is one, into the hierarchy. As mentioned earlier, the hierarchy comprises at its top the lookup handler associated with the component in focus, followed, in the reverse order of the embedding hierarchy of the focus frames, by the lookup handlers associated with the components that embed the component in focus. At the bottom of the hierarchy, the lookup handler associated with the framework is preferably installed. Shared library 439 is preferably accessible through a well-known application programming interface (API) so that any executable unit, irrespective whether its associated component data is known to the framework, can get its lookup handler installed into the hierarchy.

From step 606, the method proceeds to step 608, where the step of installing a lookup handler into a hierarchy ends.

In accordance with this embodiment, note that when a function becomes executed, if that function is provided with its own associated lookup handler as in the case of FIGS. 3G and 3H, that function preferably installs its associated lookup handler also by calling the shared library.

Figure 7:
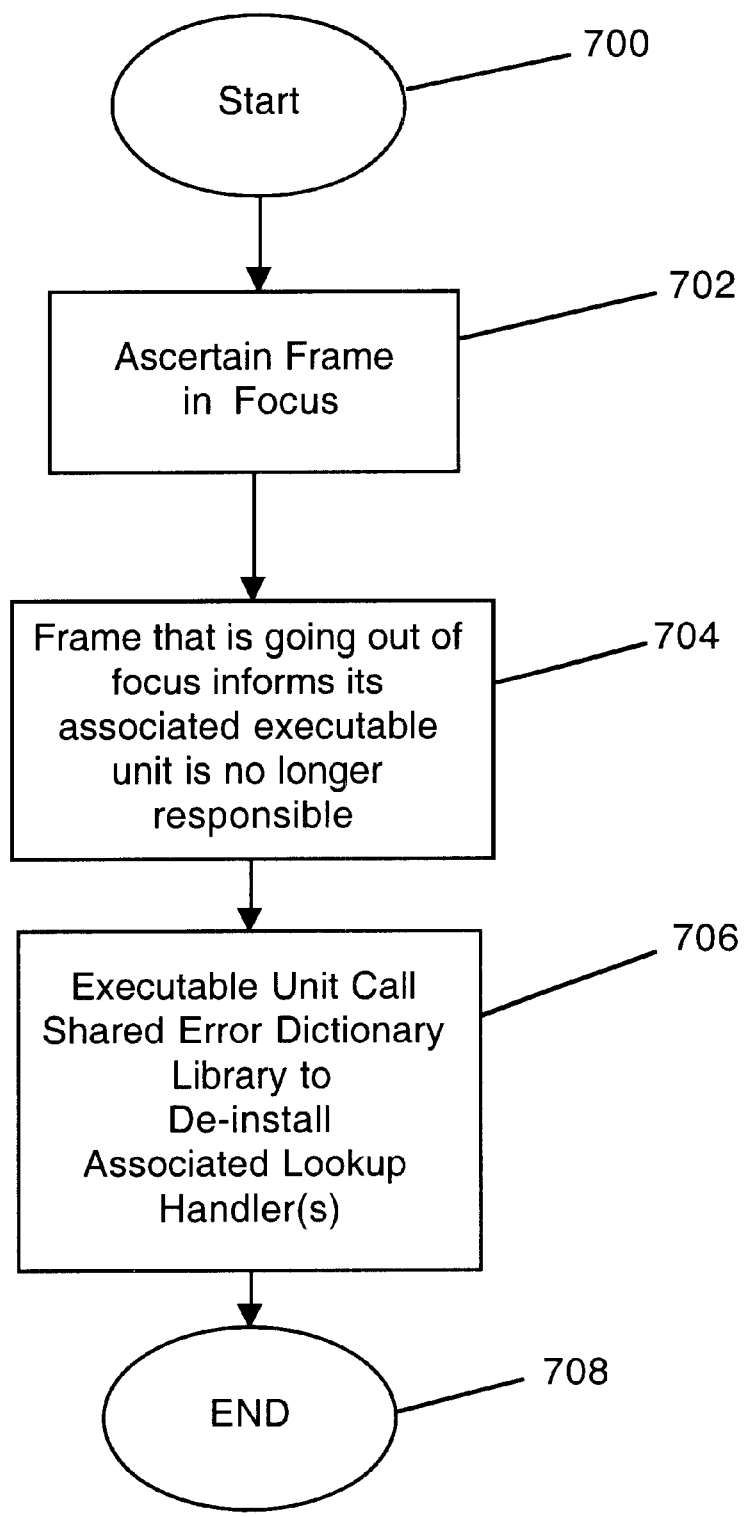

FIG. 7 shows, in accordance with one aspect of the present invention, the steps for de-installing a lookup handler from the hierarchy. As mentioned earlier, a lookup handler is removed from, or deinstalled from, the hierarchy when its associated component goes out of focus.

FIG. 7 starts at step 700. From step 700, the method proceeds to step 702 where it is ascertained that the selected component and its associated focus frame is no longer in focus. A frame is no longer in focus when, for example, the user selects a focus frame other than the frame currently in focus. From block 702, the method proceeds to block 704 where the frame that is going out of focus informs its associated component, via a message for example, that its associated executable unit is no longer responsible for rendering and executing the component data.

From step 704, the method proceeds to step 706 where the executable unit associated with the component going out of focus calls the shared library 439 to de-install its associated lookup handler from the hierarchy. From step 706, the method proceeds to step 708, where the step of de-installing a lookup handler from the hierarchy when its associated component goes out of focus ends.

In accordance with this embodiment, note that if a function that has an associated lookup handler is no longer executing, that function preferably calls the shared library to de-install its associated lookup handler from the hierarchy.

Although the preferred embodiments of the present invention have been described in detail, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. In a component-based architecture, a method for processing a first error message to produce a second error message, said component-based architecture comprising a framework which is associated with a general lookup handler, said framework being capable of embedding one or more components associated with one or more component specific lookup handlers, said method comprising:
   selecting a component;
   generating a dynamic hierarchy of lookup handlers for said selected component after said selected component has been selected, said dynamic hierarchy of lookup handlers including:
      said generic lookup handler associated with said framework; and
      a component specific lookup handler associated with said selected component;
   processing said first error message through said dynamic hierarchy of lookup handlers, wherein said first error message is first attempted to be processed through said component specific lookup handler, said first error message is then processed, if said component specific lookup handler is unable to process said first error message, through said generic lookup handler; and
   producing said second error message after processing said first error message through said dynamic hierarchy of lookup handlers.

2. The method of claim 1 wherein said generating of said dynamic hierarchy includes installing said first component specific lookup handler into said dynamic hierarchy using an install function from a shared library, said shared library being accessible to executable units associated with components embedded in said framework so that a given one of said executable units may employ said install function to install its associated lookup handler into said hierarchy when component data associated with said given one of said executable units comes into focus.

3. The method of claim 1 wherein said dynamic hierarchy further comprises a second component specific lookup handler associated with an executable unit, said executable unit representing an executable unit associated with a first focus frame that is embedded in said framework but embeds a focus frame associated with said selected component, whereby said first error message is processed through said second component specific lookup handler, if said first component specific lookup handler is unable to process said first error message, prior to any processing by said general lookup handler.

4. The method of claim 1 wherein said first component specific lookup handler is also associated with a first function within code of a first executable unit that is associated with said selected component, whereby said first component specific lookup handler is included in said dynamic hierarchy of lookup handlers only while said first function is executing.

5. The method of claim 4 wherein said first function is a subfunction of a parent function, said parent function representing a second function within code of said first executable unit and having an associated parent function lookup handler, wherein said dynamic hierarchy further comprises said associated parent lookup handler and said first error message is processed through said associated parent lookup handler, if said first component specific lookup handler is unable to process said first error message, prior to any processing by said general lookup handler.

6. In a computer implementing a component-based architecture, said component-based architecture comprising a framework that is capable of embedding a first component associated with a first executable unit for handling data of said first component, an apparatus for processing a first error message, comprising:
   a general lookup handler associated with said framework, said general lookup handler being capable of processing said first error message to produce a second error message;
   a first component specific lookup handler associated with said first executable unit, said first component specific lookup handler being capable of processing said first error message to produce a third error message; and
   means for dynamically installing said general lookup handler and said first component specific lookup handler into a dynamic lookup handler hierarchy, said first component specific lookup handler being installed by said first executable unit of said first component when said first component comes into focus, whereby said dynamic lookup handler hierarchy comprises said general lookup handler and said first component specific lookup handler when said first component is in focus due to at least some execution by said first executable unit of said first component, said dynamic lookup handler hierarchy is arranged such that said first error message is attempted to be processed by said first component specific lookup handler first, and if said first component specific lookup handler is unable to process said first error message, said first error message is then processed by said general lookup handler.

7. The apparatus of claim 6 wherein said general lookup handler is further associated with a function within codes of said first executable unit, whereby said general lookup handler is installed into said dynamic lookup handler hierarchy only while said function is executed.

8. The apparatus of claim 6 wherein said first component is embedded in a second component, said second component being associated with a second executable unit for handling data of said second component, said second executable unit being associated with a second component specific lookup handler, and whereby said installing means also installs said second component specific lookup handler into said dynamic lookup handler hierarchy between said first component specific lookup handler and said general lookup handler when said first component comes into focus.

9. In a component-based architecture, a computer readable medium containing program instructions for processing a first error message to produce a second error message, said component-based architecture comprising a framework which is associated with a general lookup handler, said framework being capable of embedding one or more components associated with one or more component specific lookup handlers, said program instructions include instructions for:

selecting a component;

generating a dynamic hierarchy of lookup handlers for said selected component after said component has been selected, said dynamic hierarchy including:
said general lookup handler; and
a first component specific lookup handler associated with said selected component;

processing said first error message through said dynamic hierarchy of lookup handlers, whereby said first error message is first attempted to be processed through said first component specific lookup handler, said first error message is then processed, if said first component specific lookup handler is unable to process said first error message, through said general lookup handler;

producing said second error message after processing said first error message through said dynamic hierarchy of lookup handlers; and wherein said dynamic hierarchy of lookup handlers is implemented as a doubly linked list.

10. The computer readable medium of claim 9 further comprising programmed instructions for removing said first component specific lookup handler from said dynamic hierarchy of lookup handlers when another component is selected.

11. The computer readable medium of claim 9 wherein said generating instruction comprises instructions for installing said first component specific lookup handler into said dynamic hierarchy using an install function from a shared library, said shared library being accessible to executable units associated with components embedded in said framework so that a given one of said executable units may employ said install function to install its associated lookup handler into said hierarchy when component data associated with said given one of said executable units comes into focus.

12. The computer readable medium of claim 9 wherein said dynamic hierarchy further comprises a second component specific lookup handler associated with an executable unit, said executable unit representing the executable unit associated with a first focus frame that is embedded in said framework but embeds a focus frame associated with said selected component, whereby said first error message is processed through said second component specific lookup handler, if said first component specific lookup handler is unable to process said first error message, prior to any processing by said general lookup handler.

13. The computer readable medium of claim 9 wherein said first component specific lookup handler is also associated with a first function within code of a first executable unit associated with said first component specific lookup handler, whereby said first component specific lookup handler is included in said dynamic hierarchy of lookup handlers only while said first function is executing.

14. In a component-based architecture, a method for processing a first error message to produce a second error message, said component-based architecture comprising a framework which is associated with a first lookup handler, said framework being capable of embedding a first component associated with a first executable unit for handling data of said first component, said method comprising:

generating a hierarchy of lookup handlers that are arranged as a doubly linked list, wherein said generating comprises the step of installing said second lookup handler into said hierarchy using an install function from a shared library, said shared library being accessible to executable units associated with components embedded in said framework so that a given one of said executable units may employ said install function to install its associated lookup handler into said hierarchy when component data associated with said given one of said executable units comes into focus;

said hierarchy including:
said first lookup handler; and
a second lookup handler associated with said first executable unit when said first component comes into focus; and processing said first error message through said hierarchy of lookup handlers to generate said second error message, whereby said first error message is first processed through said second lookup handler, said first error message is then processed, if said second lookup handler is unable to process said first error message, through said first lookup handler, and wherein said second error message is more specific to said first component than said first error message.

15. The component-based architecture method of claim 14 wherein said first lookup handler is further associated with a function within codes of said first executable unit, whereby said first lookup handler is installed into said lookup handler hierarchy only while said function is executed.

16. The component-based architecture method of claim 15 wherein said function is a sub-function of a parent function, said parent function representing a second function within code of said first executable unit and having an associated parent function lookup handler, wherein said hierarchy further comprises said associated parent lookup handler and said first error message is processed through said associated parent lookup handler, if said second lookup handler is unable to process said first error message, prior to any processing by said first lookup handler.

17. The component-based architecture method of claim 14 wherein said hierarchy further comprise a third look up handler associated with a second executable unit, said second executable unit representing the executable unit associated with a first focus frame that is embedded in said framework but embeds a focus frame associated with said first component, whereby said first error message is processed through said third lookup handler, if said second lookup handler is unable to process said first error message, prior to any processing by said first lookup handler.

18. The computer readable medium of claim 13 wherein said first function is a subfunction of a parent function, said parent function representing a second function within code of a first executable unit and having an associated parent function lookup handler, wherein said dynamic hierarchy further comprises said associated parent lookup handler and said first error message is processed through said associated parent lookup handler, if said first component specific lookup handler is unable to process said first error message, prior to any processing by said general lookup handler.

19. The method as in claim 1, further including removing said first component specific lookup handler from said dynamic hierarchy of lookup handlers when another component is selected.

20. The method as in claim 1, wherein said component is selected when said component comes in focus.

21. In a component-based architecture, a method for processing errors associated with one or more components of said component-based architecture, said component-based architecture having one or more lookup handlers associated therewith, said method comprising:

selecting a component of said component-based architecture;

generating a dynamic hierarchy of lookup handlers after receiving said selecting, said dynamic hierarchy of lookup handlers including a generic lookup handler and a component specific lookup handler associated with said selected component;

receiving an error to be processed through said dynamic hierarchy of lookup handlers;

determining whether said error can be processed by said component specific lookup handler;

processing said error by said component specific lookup handler when said error can be processed by said component specific lookup handler;

processing said error by said general lookup handler when said error cannot be processed by said component specific error handler; and producing an error output for said error after being processed through said dynamic hierarchy of lookup handlers; and wherein said dynamic hierarchy of lookup handlers is implemented as a doubly linked list.

22. The method of claim 21, wherein said error output is an error message that is more context specific when the said error is processed by said component specific lookup handler than another error message output when said error is processed by said general lookup handler.

23. The method of claim 22, wherein said selecting of said component is performed when said component comes into focus.

24. The method of claim 21, said method further comprising:

selecting another component of said component-based architecture; and modifying said dynamic hierarchy of lookup handlers after said selecting of said another component.

25. The method of claim 24, wherein modifying said dynamic hierarchy of lookup handlers includes removing said component specific lookup handler for said selected component from said dynamic hierarchy of lookup handlers.

26. The method of claim 25, wherein said modifying said dynamic hierarchy of lookup handlers further includes adding a second component specific lookup handler associated to said dynamic hierarchy of lookup handlers, said second component specific handler being associated with said another component.

* * * * *